US006908556B2

(12) United States Patent
Sublette

(10) Patent No.: US 6,908,556 B2
(45) Date of Patent: Jun. 21, 2005

(54) METHODS FOR FORMING MICROCULTURES WITHIN POROUS MEDIA

(75) Inventor: Kerry L. Sublette, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 10/281,687

(22) Filed: Oct. 28, 2002

(65) Prior Publication Data

US 2003/0121853 A1 Jul. 3, 2003

Related U.S. Application Data

(63) Continuation-in-part of application No. 09/728,962, filed on Dec. 4, 2000, now Pat. No. 6,471,864.
(60) Provisional application No. 60/168,484, filed on Dec. 2, 1999.

(51) Int. Cl.[7] .................................................. C02F 3/00
(52) U.S. Cl. ........................ 210/615; 210/616; 210/617; 210/170
(58) Field of Search ................................ 210/615–617, 210/170

(56) References Cited

U.S. PATENT DOCUMENTS

| 4,530,763 A | * | 7/1985 | Clyde et al. | 210/610 |
| 5,211,848 A | * | 5/1993 | Friday et al. | 210/611 |
| 5,486,292 A | * | 1/1996 | Bair et al. | 210/616 |

FOREIGN PATENT DOCUMENTS

| JP | 61058588 A | * | 3/1986 | C12N/11/12 |

* cited by examiner

Primary Examiner—Chester T. Barry
(74) Attorney, Agent, or Firm—Head, Johnson & Kachigian

(57) ABSTRACT

Highly porous, beads are comprised of a polymer and a second compound mixed into it. The second compound, an amendment, is either a nutrient or a compound having high affinity to one or more nutrients. A plurality of these beads may be exposed to an aqueous environment, usually a body of water. Bacteria and other microorganisms rapidly enter and remain within the nutrient filled interior space of the beads. Any of a number of various detection methods may then be used to characterize, detect and/or identify the microorganisms.

14 Claims, 13 Drawing Sheets

SEM of Porous Bead Cross Section

Figure 3. SEM of Porous Bead Cross Section

Figure 4. SEM of Outer Skin of Porous Beads

Figure 5. Interior Surfaces of Porous Beads

Figure 8. SEM of PAC/HRC Porous Bead

Figure 9. PLFA/Bead 30-Day Exposure Dry Cleaner Site

Tree Diagram for 11 Cases
Ward's method
1-Pearson r

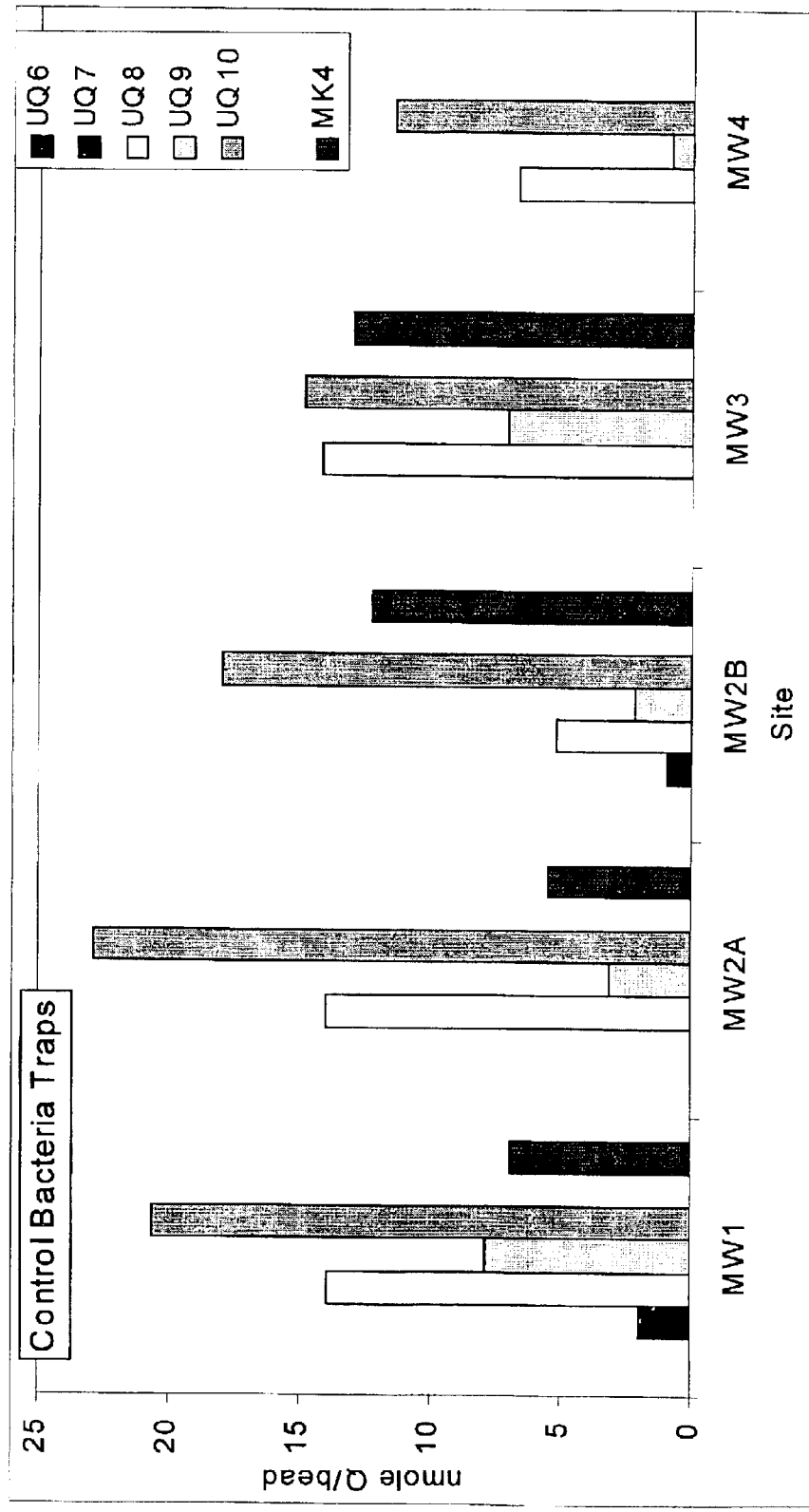

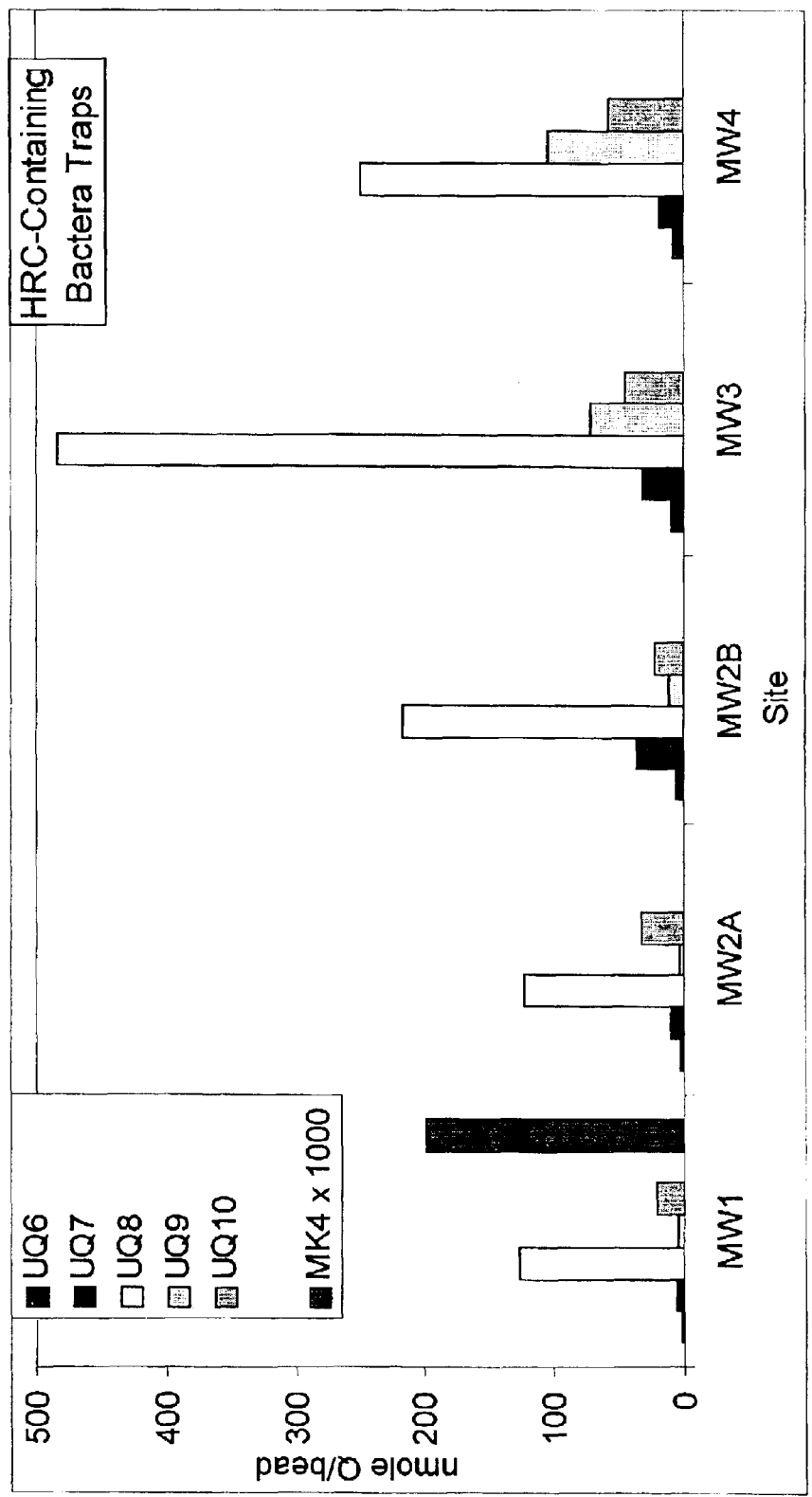
Figure 11b. Respiratory Quinone Analysis of PAC/HRC Beads

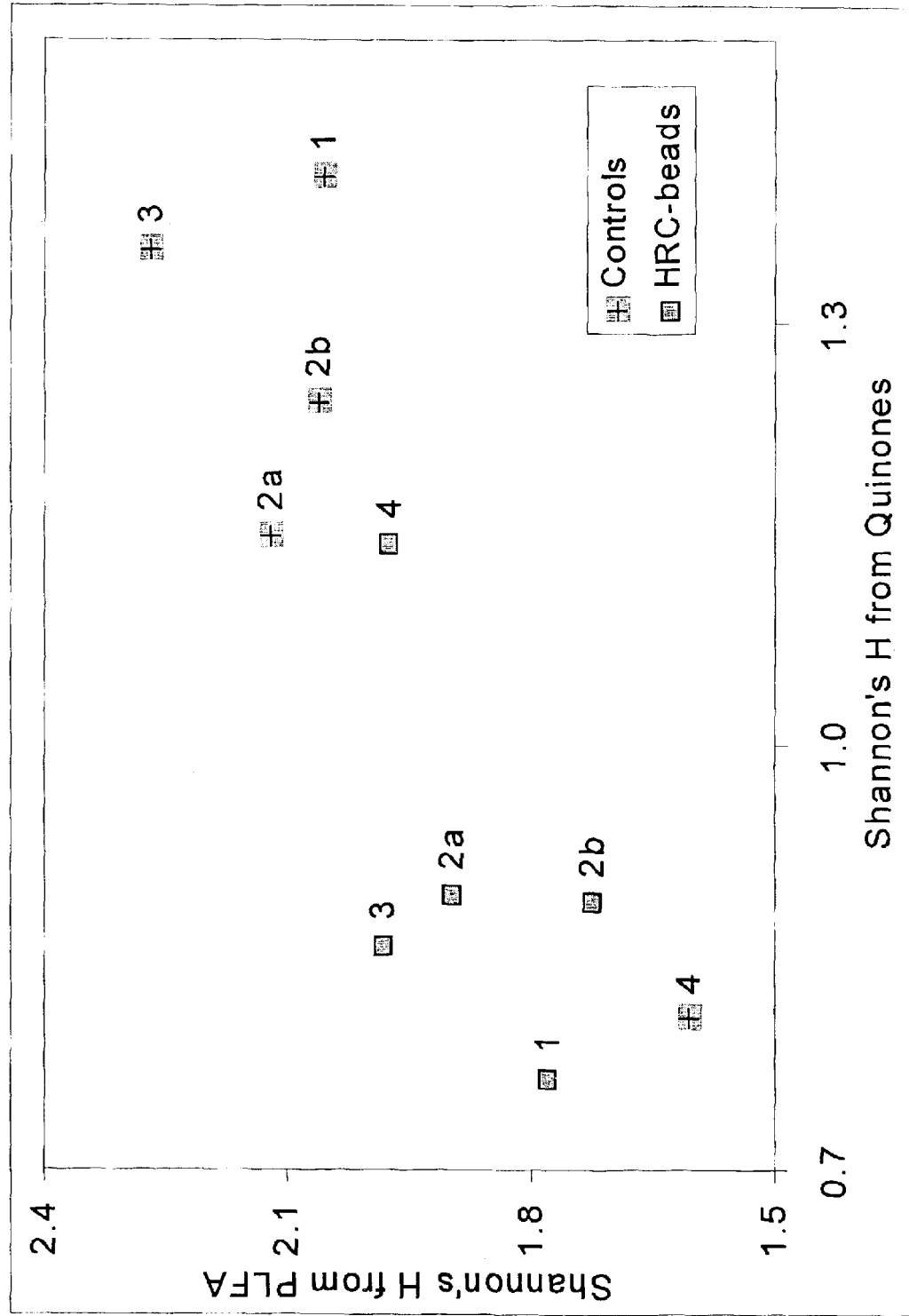

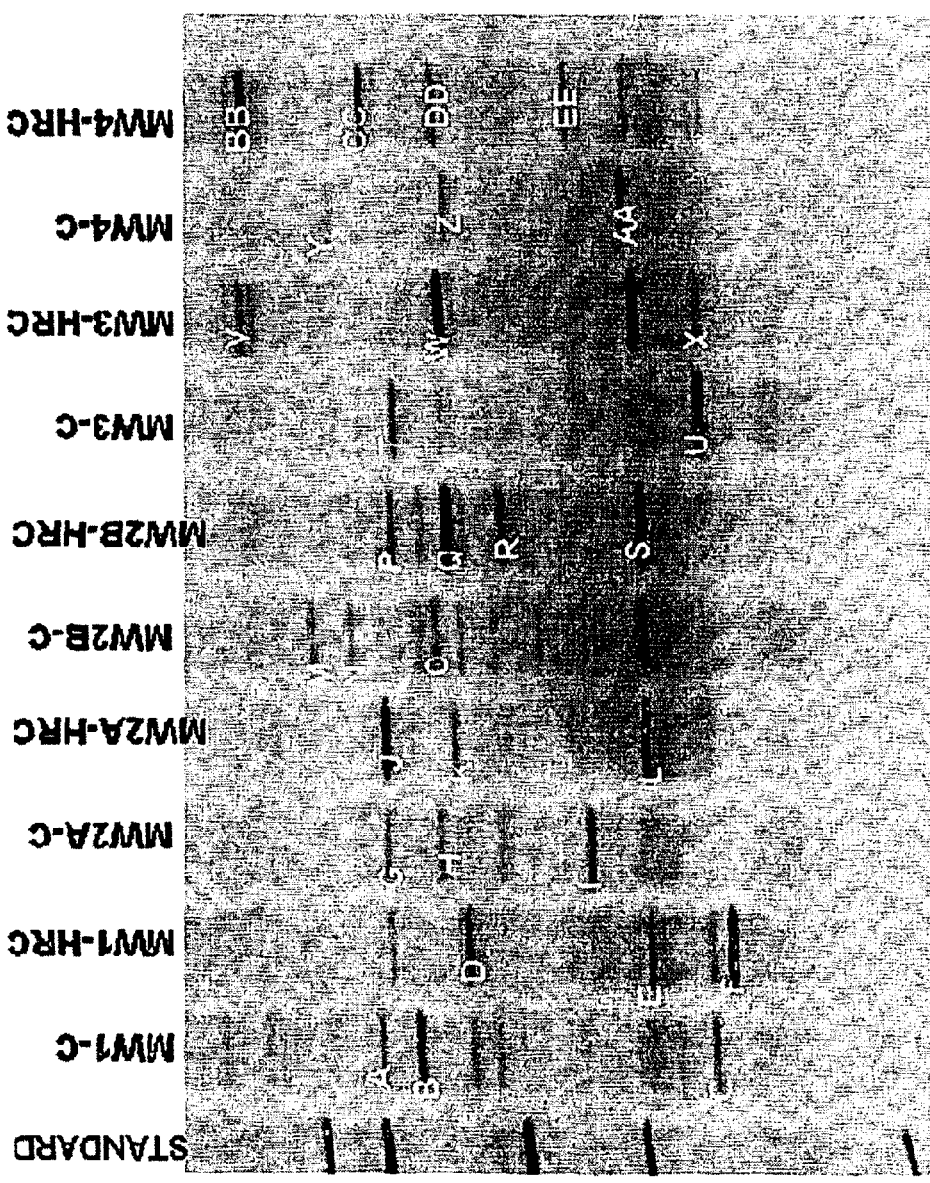
Figure 13. DGGE Image of 16S rDNAs from PAC and PAC/HRC Beads

METHODS FOR FORMING MICROCULTURES WITHIN POROUS MEDIA

CROSS-REFERENCE TO RELATED APPLICATIONS

This is a continuation-in-Part of U.S. patent application Ser. No. 09/728,962 filed Dec. 4, 2000 now U.S. Pat. No. 6,471,864 issued Oct. 29, 2002, which claims priority to U.S. Provisional Application Ser. No. 60/168,484 filed on Dec. 2, 1999.

BACKGROUND OF THE INVENTION

1. Field of the Invention

The present invention relates to methods and devices for forming microcultures within porous media. Specifically, the present invention relates to methods and materials for: 1) capturing, collecting, or isolating various bacteria and other microorganisms from aqueous environments in the form of biofilms for the purpose of characterization of community structure or identification of specific organisms or 2) concentrating and/or immobilizing specific types of bacteria and/or other microorganisms for the purpose of holding or retaining same within a bioreactor environment. The present invention may be used to capture, collect, or isolate bacteria and other microorganisms in the form of representative biofilms from water sources, such as streams, lakes, reservoirs, and groundwater as well as other aqueous environments such as drinking water or wastewater treatment systems, cooling towers, storage tanks, or any commercial or industrial process which employs or produces an aqueous phase. The present invention may also be used to concentrate and/or immobilize selected bacteria or other microorganisms within a bioreactor and thereby increase the volumetric productivity of the bioreactor. The present invention is a significant improvement over existing technology in that 1) biofilms form rapidly in the present invention and biofilms are more indicative of the operative microbiology of the aqueous environment to which the invention is exposed and 2) the present invention can also make the concentrated or immobilized state the preferred state over the planktonic or "free-floating" mode of existence for specific microorganisms in a bioreactor environment, thereby concentrating and retaining specific types of microorganisms within a bioreactor and thereby concentrating the biocatalytic activity of same and improving the performance of the bioreactor.

2. Prior Art

For a variety of reasons, it is highly desirous to have efficient, accurate, and sensitive methods of detecting, characterizing, and/or identifying microorganisms from aqueous environments. Water treatment facilities for preparing potable water, sewage and wastewater treatment facilities, environmental engineers, ecologists, biologists, and the agriculture industry, to name a few, all require a fast and accurate method for determining the characteristics of operative microbial communities and/or the presence of specific types of microorganisms in aqueous systems.

Microorganisms in aqueous environments have a natural affinity for solid surfaces and commonly form biofilms with complex community structures. Biofilms can concentrate nutrients, exclude toxic substances, facilitate beneficial cross feeding, and promote other interactions between microorganisms that benefit the members of the community. Therefore, microorganisms generally prefer biofilms over the planktonic or "free-floating" state. Planktonic microorganisms in an aqueous environment are generally those that have not yet been taken up by biofilms or sloughed off from biofilms as the biofilms grow in size. It has been frequently observed that the physiology of many microorganisms is different in biofilms compared to planktonic or "free-floating" organisms. Therefore, the microbial ecology of an environment populated with microorganisms is best represented by biofilm communities rather than by organisms that are planktonic or "free-floating". The most common current method for detecting the presence and types of bacteria, fungi, and other microorganisms in an aqueous environment consists of placing a series of "coupons" at various points in the system. Coupons are generally relatively small plastic strips to which bacteria and other microorganisms attach to form biofilms. Typically, these coupons must remain in a body of water for a long period of time in order to have an adequate amount of microbial biomass attach to facilitate analysis of the biofilm community. The time required to form biofilms depends on the quality of the water and a number of environmental factors but incubation times of weeks or months are not uncommon. Shear forces and the lack of any attractants make coupons a relatively poor substrate for microorganisms to attach to. Another method of collecting representative biofilm communities and detecting the presence of specific types of microorganisms consists of placing glass wool in a perforated vial and placing the vial in the water. However, these glass wool devices suffer from the same slow and low uptake as the more conventional coupons.

It is therefore desirable to provide a method and device for rapid uptake of large amounts of microbial biomass in representative biofilms from a variety of aqueous environments.

SUMMARY OF THE INVENTION

In the present invention, porous media are utilized to collect microorganisms from a surrounding aqueous phase in the form of representative biofilms; that is, biofilms that are representative of the biofilm communities found to exist on solid surfaces in contact with that aqueous phase. In the preferred embodiment of the current invention the porous medium utilized is in the form of porous beads. The porous beads are held within a vessel made of materials that are sufficiently chemically inert so as not to interfere with the collection of microorganisms by the porous beads. The vessel containing the porous beads is then held in contact with an aqueous phase by a variety of methods depending on a number of factors including whether the aqueous phase is stagnant or flowing, physical location, etc. The present invention is especially useful in detecting specific types of microorganisms such as pathogens in water supplies. It is also useful for detecting entrance points of various microbes into moving bodies of water such as rivers and streams as well as characterizing microorganisms in pristine or contaminated aqueous streams such as groundwater, drinking water, or wastewater. Further, the present invention is also useful for the evaluation of remediation amendments for contaminated aquifers.

The preferred embodiment of the present invention is comprised of beads approximately 2–4 millimeters or less in diameter. These beads are formed by known techniques such that they are highly porous. To the polymer matrix that forms the beads are added various amendments, or chemical compounds (either synthetic or naturally occurring), that either attract and bind to nutrients from an aqueous environment, are nutrients themselves, or interact with the aqueous environment in some other way to make the inside of the beads more conducive to the growth of specific types of microorganisms. These amendments, or materials bound to them, serve as attractants, because they attract specific types of microorganisms either by providing nutrients preferred by specific types of microorganisms or providing a growth environment preferred by specific types of microorganisms. Both the nature of the beads and the presence of attractants cause bacteria and other microorganisms to enter the pores in the skin of the beads, encounter copious attractive surface area, and thereby form biofilms or microcultures.

Within a very short amount of time, significantly faster than other known methods, a number of microorganisms sufficient to perform known detection, characterization, and identification assays are present within a collection of microculture beads. These assays may be rapidly and readily performed on the beads such that the microorganisms present in biofilms associate with a given body of water may be accurately detected.

Another significant advantage of forming microcultures or biofilms within the beads disclosed herein is that microorganisms that are difficult to culture in the laboratory may be readily collected because of the favorable growth environment provided by the biofilm community structures. It is well known in the art that there are a wide variety of microorganisms for which no growth medium has been developed. Because these microorganisms cannot be grown in a laboratory, it is often difficult to acquire a sufficient number of required organisms in order to reliably and accurately perform a detection, characterization, or identification assay. The microculture beads of the present invention overcome this deficiency by rapidly forming natural biofilms representative of the aqueous environment in contact with the beads.

Those skilled in the art will appreciate that the present invention is suitable for use with a variety of detection, characterization, and identification assays. Phospholipid fatty acid (PLFA) analysis, respiratory quinone analysis, polymerase chain reaction (PCR) amplification of 16S rDNA, real-time PCR, and other techniques of molecular biology may all be utilized to detect, characterize, and/or identify microorganisms in the present invention without the need of removing microorganisms from the beads. Another advantage of the current invention is the observation that biomolecules, especially DNA, is more readily extracted (faster, more efficiently, and with less contamination) from the current invention than environmental samples.

It is therefore an object of the present invention to provide beads capable of forming representative microcultures or biofilms of microorganisms from aqueous phases within the beads.

It is another object of the present invention to provide a method for characterizing, detecting, and identifying the presence of specific types of microorganisms in an aqueous solution or body of water.

It is another object of the present invention to provide a method of culturing microorganisms that are unsuitable for culturing on agar plates or liquid media.

BRIEF DESCRIPTION OF THE DRAWINGS

FIG. 13 is a DGGE gel image comparing 16S rDNA segments obtained from PAC and PAC/HRC beads in an aquifer contaminated with PCE

DETAILED DESCRIPTION OF THE PREFERRED EMBODIMENTS

Figure 1:
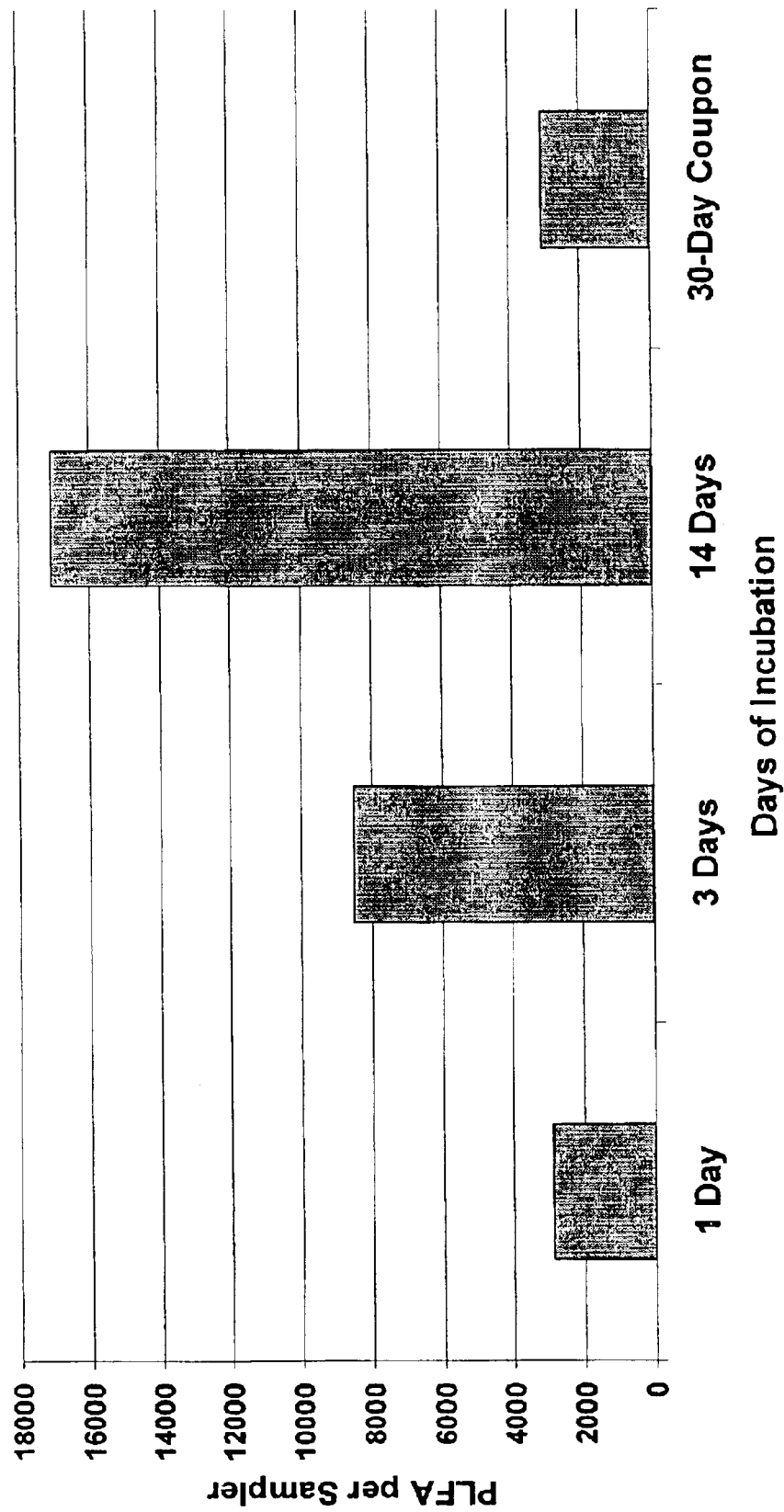
FIG. 1 is a graph of the ability of the porous beads of the present invention to collect biomass in a drinking water system compared to a conventional PVC coupon

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, highly porous beads are formed having very internal surface area. The beads used herein are very similar to the porous beads described in U.S. Pat. No. 5,486,292 to Bair owned by the Assignee herein, which is incorporated herein by reference. The beads of the present invention are preferably comprised of an aramid polymer selected from poly(m-phenylene isophthalamide) and copolymers thereof, and a polymer or copolymer formed from m-phenylene diamine and an acid selected from the group consisting of terephthalic acid, isophthalic acid and 2,4-diaminobenzene sulfonic acid. It is also preferable to utilize beads made from polymers capable of withstanding sterilization and cleaning methods, such as high temperature (300° C.) and the combination of high temperature and pressure created by autoclaves. More sensitive plastics may be used. However, because these plastics cannot be sterilized, they are practically guaranteed to contain viable microorganisms and have residual "fossil" biomarkers in them that will result in false readings of microorganisms characterization, detection, and identification. Unsterilized beads may also have DNAse's and RNAse's that can frustrate hybridization and PCR procedures.

The microculture beads of the present invention are comprised of a polymer as described above and additionally one or more amendments which may or not include powdered activated carbon (PAC) which is an integral component of the beads in the patent referenced above. The amendments of the present invention are either nutrients themselves, are capable of binding nutrients from the aqueous environment the beads are in contact with, or capable of interacting with the internal bead environment to produce conditions more favorable to microbial growth. These amendments and/or materials bound to them serve as both attractants and a food source for specific microorganisms or modifiers of the bead environment. These beads are generally placed in a water permeable vial or vessel and immersed in the body of water to be tested. Bacteria and other microorganisms are attracted to the internal surface of the beads and rapidly form microcultures or biofilms. Factors which account for the rapid formation of biofilms in the beads include hydrophobicity of the polymer surface, high internal surface area (>200 $m^2$ per gram), low shear conditions, concentration of limiting nutrients by the PAC or other amendments, and rapid formation of pre-conditioning films. It is well know that the rate-limiting factor in the formation of natural biofilms is the availability of some limiting nutrient, usually a carbon source. PAC and other amendments bind and concentrate nutrients on the inside of the beads greatly favoring biofilm formation inside the beads. A wide variety of methods in molecular biology for characterization, detection, and identification of microorganisms known to those skilled in the art may then be applied to the beads in order to determine the presence and identity of the various microorganisms forming microcultures or biofilms within the beads.

Figure 2:
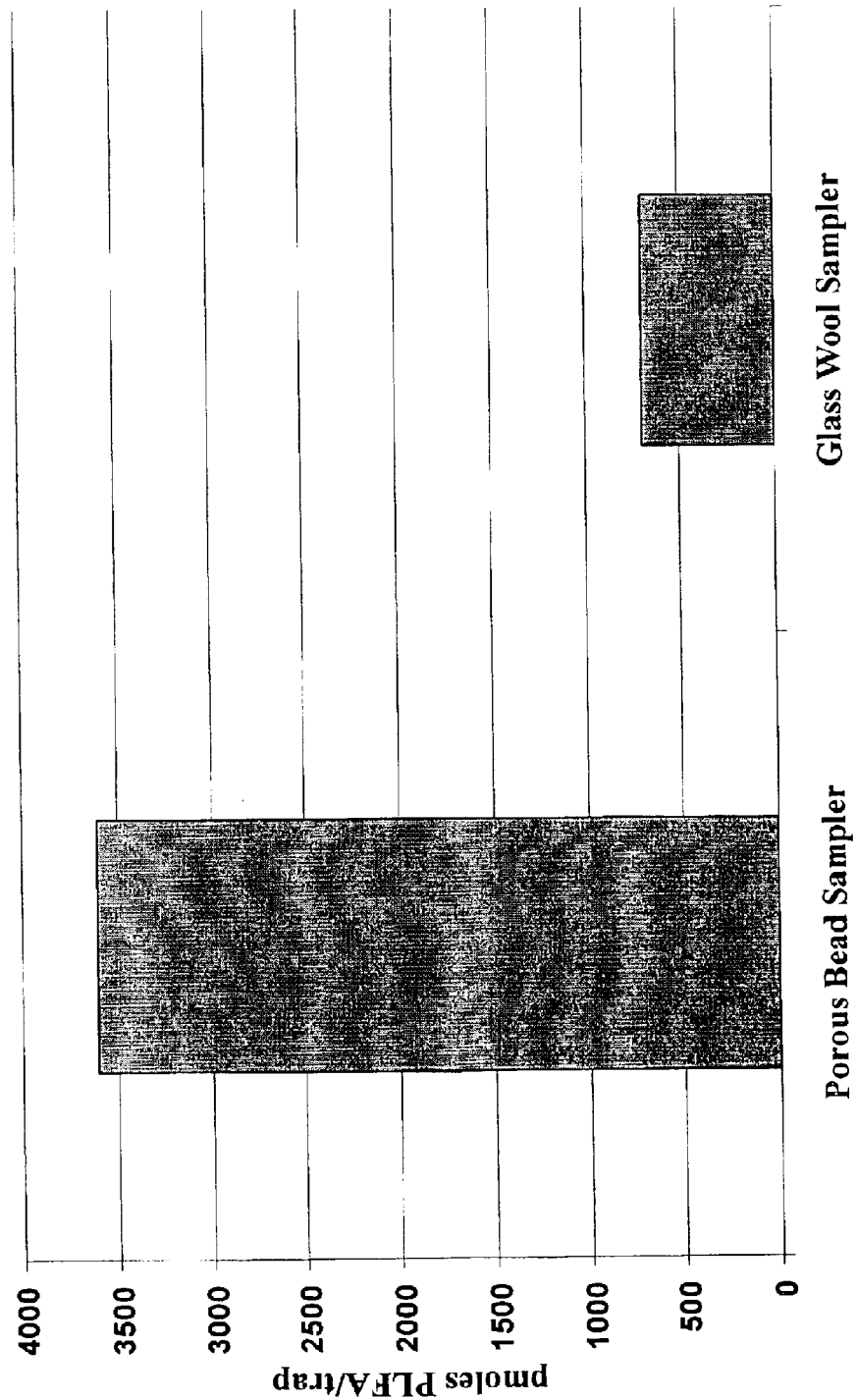
FIG. 2 is a graph of the ability of the porous beads of the present invention to collect biomass in a PCE contaminated aquifer compared to glass wool

Formations of microcultures within the beads is extremely fast compared to existing methodologies. For example, a vial of about 500 beads is capable of producing enough organisms in microcultures or biofilms in drinking water systems to perform detection assays within a 24-hour period. This is significantly shorter than the one-month collection time required by coupons in drinking water systems as shown in FIG. 1. In addition, as shown in FIG. 2, the amount of microbial biomass collected by a vial of about 50 beads in contact with an aquifer contaminated with an average of 2 mg/L of perchloroethylene (PCE) for 30 days was six times greater than that collected an equal volume of glass wool over the same time period. In each case the attractant was PAC.

Figure 3:
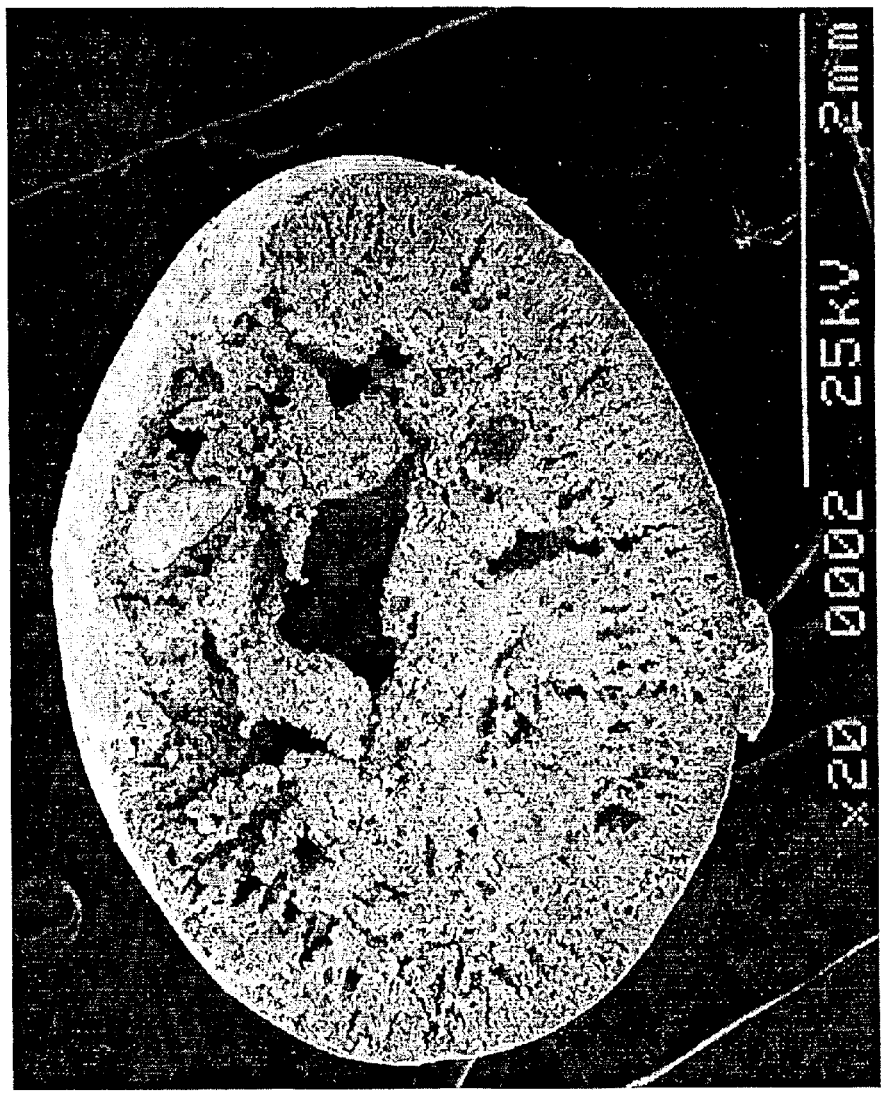
FIG. 3 is a scanning electron micrograph of a cross section of a porous bead of the present invention FIG. 4 contains two high-magnification scanning electron micrographs of the skin of the porous beads of the present invention
Figure 4:
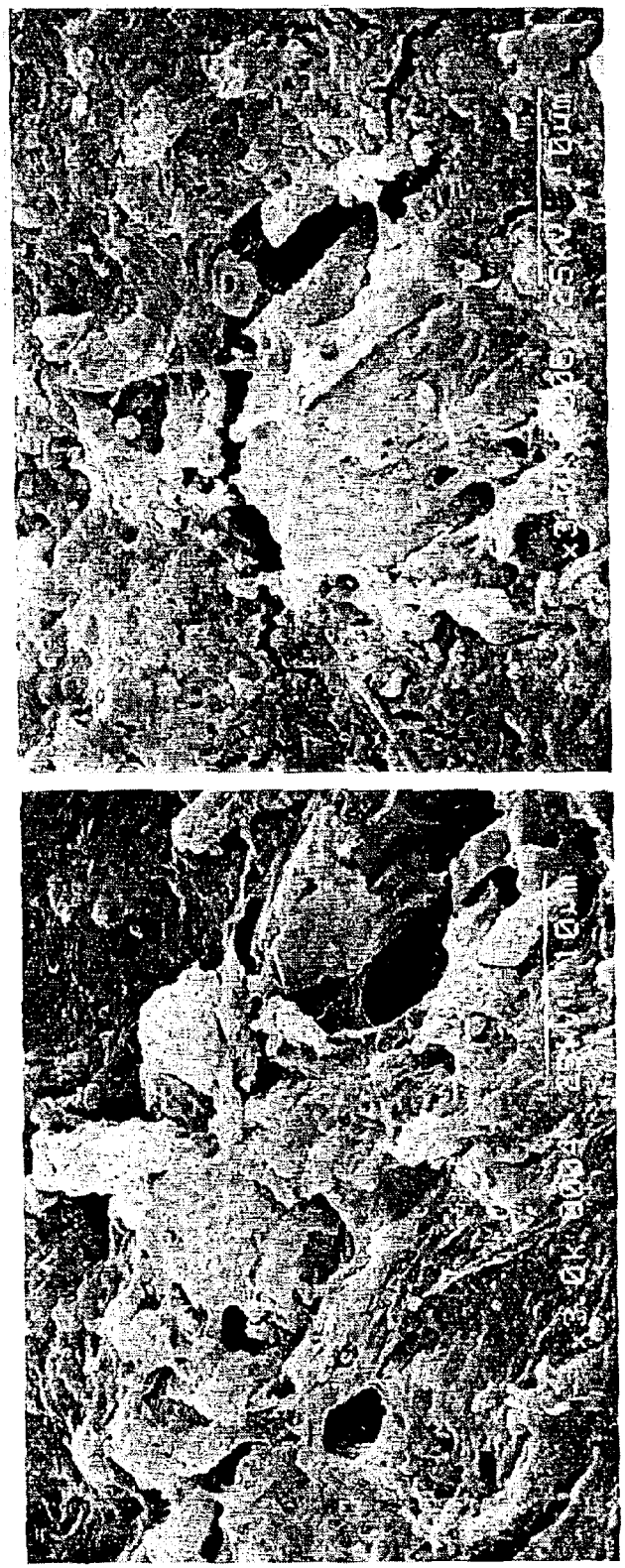
Figure 5:
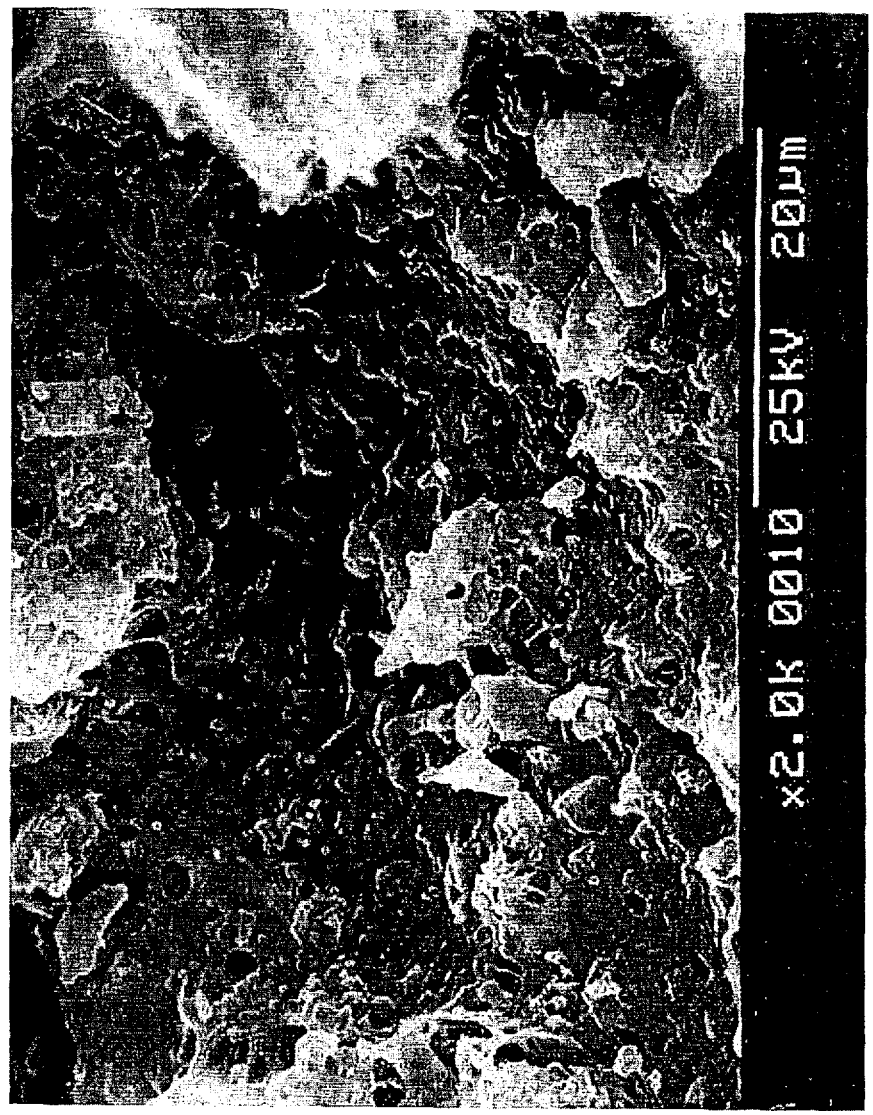
FIG. 5 is a high-magnification scanning electron micrograph of the interior of a porous bead of the present invention
Figure 6:
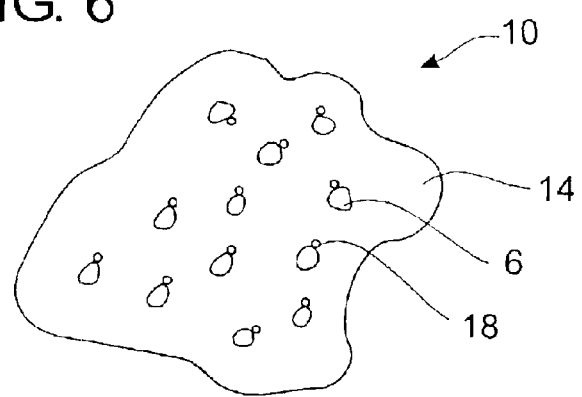
FIG. 6 is a schematic diagram of an interior surface of the porous beads of the present invention

A scanning electron micrograph (SEM) of a typical porous bead of the present invention is provided in FIG. 3. The highly porous nature of the beads is evident in this micrograph. The porous bead is typically 2 to 4 millimeters in diameter. It is preferable to have beads of relatively uniform size. Having a mixture of beads wherein some of the beads are many times smaller than the largest beads is generally undesirable, as the smaller beads may become lodged in the spaces between the larger beads and reduces the productivity of the bead vial or vessel by limiting the movement of water within the vial. FIG. 4 provides high-magnification SEMs of the skin of the porous beads showing the holes and tears in the skin which provide access for microorganisms to the inside of the beads. FIG. 5 provides a high-magnification SEM of some of the interior surface of the beads available for the formation of microcultures or biofilms. FIG. 6 is a schematic diagram of a typical interior surface of the beads that form the present invention. The beads interior surfaces 10 are comprised of polymer 14 and amendments 16. The polymers mentioned above are generally the most preferable polymers used. However, any polymers that are capable of withstanding the high temperatures of sterilization and cleaning techniques and susceptible to techniques of forming porous beads when mixed with some type of aggregate such as the amendments listed herein will be suitable. Amendments 16 may be any of a wide variety of materials. These materials fall into one of two categories, and some of the amendments overlap into both categories.

The first category of amendments is materials that may be used to bind nutrients. Amendments 16 in FIG. 6 are of this variety. Activated alumina, silica gel, certain clays, adsorptive resins, and zinc oxide are examples of amendment materials in this category. In addition to these and similar amendments PAC may also be incorporated into the polymer matrix as described by U.S. Pat. No. 5,486,292 to Bair owned by the Assignee and referenced above. Powdered activated carbon (PAC) binds to a wide variety of nonpolar organic compounds including hydrocarbons and halogenated hydrocarbons. PAC may also be employed in fabrication of the porous beads of the present invention strictly to produce desired physical properties in the beads. Activate alumina and silica gel bind certain classes of polar organic compounds, clays bind certain cations, zinc oxide binds well to sulfides and mercaptans, whereas adsorptive resins can other similar materials can be fashioned to have even more specific adsorptive properties. Referring to FIG. 6, amendments 16 are interspersed throughout the porous bead of the present invention. They may have nutrients 18 bound to them on portions of the surface area where the amendments are exposed.

There are two methods by which nutrients may be applied to the amendments within the beads. One option is to treat the porous beads after they have been cleaned and sterilized but before they are exposed to the aqueous environment to be tested. Treatment consists of soaking them in a solution having a relatively high concentration of the nutrients that are desired to be attached to the amendments in the beads. The nutrients will bind to the amendments, and the beads may then be placed in a vial, vessel or other suitable device for holding them. The vial of beads is then introduced to the aqueous environment to be tested. The second method of attaching nutrients to the amendments is to expose the aqueous environment to be tested subsequent to cleaning and sterilization. Nutrients in the aqueous environment may then naturally attach to the porous amendments in the porous beads thereby concentrating the nutrients on the inside of the beads.

Microorganisms will be attracted to nutrients inside the beads and within the macro and micro pores of the beads. Once nutrients attached to amendments are depleted by consumption by microorganisms, other nutrients in the aqueous environment will then bind to the amendments such that microorganisms are provided a constant, steady supply of nutrients on which to feed. The second class of amendments are those that are themselves nutrients. Those skilled in the art will appreciate that there are a large variety of compounds that make suitable nutrients. In addition, selecting particular nutrients will allow selectivity of the porous beads for a class of microorganisms, or even a specific microorganism. For example, utilizing elemental sulfur as the amendment will result in cultures comprised primarily of sulfotrophs. Organisms that do not metabolize sulfur will be less attracted to the porous bead internal environment. Other compounds that may be used as amendments that serve as attractive nutrients include polylactates, known commercially as hydrogen release compound (HRC), which slowly hydrolyze to generate lactate and carbonates (for autotrophs). Alternatively, to ensure that all desired types of microorganisms are captured by the porous beads and propagated to a level that allows characterization, detection, and/or identification a mixture of several different nutrients may be used as amendments incorporated into the porous beads. In addition porous beads of the current invention may incorporate both types of amendments described herein. These types of amendments which are themselves nutrients are not illustrated in FIG. 6 but the difference is subtle. Referring to FIG. 6, if the amendments 16 were themselves nutrients, microorganisms would be feeding directly on them and there would be no attached nutrients 18.

Figure 7:
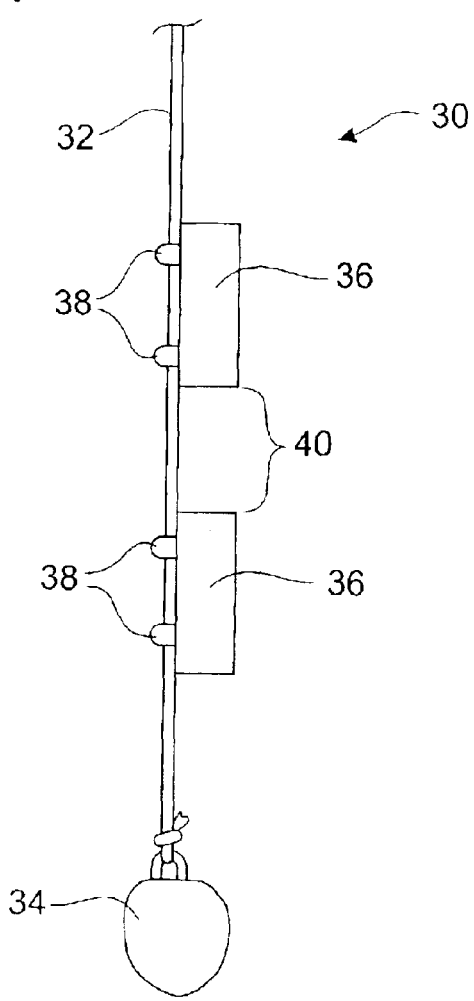
FIG. 7 is a schematic diagram of a device for collecting representative biofilms from water using porous beads of the current invention

FIG. 7 shows an illustrative device for use in preparing microcultures within the porous beads in order to characterize, detect, and/or identify microorganisms present in a body of a water such as groundwater collected in a groundwater monitoring well. Testing device 30 is comprised of rope 32 to which weight 34 and vials 36 are attached. This device is especially well suited for a variety of bodies of water. Weight 34, located at the bottom of rope 32, causes the device to sink as far down as desired. Vials 36 are separated by a distance 40. This distance will be determined by the person testing the water. Those skilled in the art will appreciate that different types of microorganism may exist in different concentrations at different depths within a body of water. The use of multiple vials allows each level of the water to be tested simultaneously. How long distance 40 is will depend on a variety of factors known to those skilled in the art. Vials 36 are attached to rope 32 by attaching clamps 38. Those skilled in the art will appreciate that there are a wide variety of means by which to attach vials to a rope. Vials 36 themselves may also take any of a wide variety of shapes. Throughout this disclosure, porous bead holding devices are referred to as vials or vessels. However, those skilled in the art will appreciate that these vials or vessels may be made of plastic, glass, metal, wood, cloth or any of a wide variety of other materials, so long as the porous bead holding vial is water permeable and prevents the porous beads from leaving the vial or vessel. Therefore, if a porous material is used, the pores of the material must be substantially smaller than the microbeads but also large enough for water and microorganisms to enter the vial. Those skilled in the art will appreciate that there are a variety of suitable materials for making porous bead vials.

The device in FIG. 7 is suitable for use in lakes, reservoirs, wells, rivers and streams, and aquifers. In the case of rivers or streams, it maybe desirable to have only a single vial on device 30 and to tie rope 32 to an object near the stream. Several of these devices could be placed along the river in order to determine where which microorganisms enter the stream. Alternatively, device 30 may have several vials attached for use in a deep lake, reservoir or even water well.

Once sufficient time has been given for microorganism collection and propagation, porous beads may be removed from the tested water and be treated by any of a variety of detection methods in order to characterize, detect, and/or identify the microorganisms present in the body of water. The period of incubation of the porous beads vials or vessels in the aqueous phase to be tested will be variable depending on water quality and environmental conditions; however, incubation times of 24 hours or less may be suitable.

This method of collecting microorganisms is especially advantageous in that it does not require growth on an agar or liquid medium in a laboratory. There are a number of microorganisms for which agar and liquid growth medium are lacking. The use of porous beads of the present invention circumvents that problem.

Relatively simple detection methods, such as quantifying the amount of protein present, may be utilized to simply test the presence of microorganisms in the water. More complex tests, such as PLFA and PCR amplification of 16S rDNA may be used to characterize the community or to determine the exact identity of the microorganisms within the porious beads. For example, those skilled in the art will appreciate that porous beads, may be extracted with chloroform/methanol solvents to recover DNA. Appropriate primers can then be used to amplify 16S rDNA. Denaturing gradient gel electrophoresis (DGGE) may then be used to separate 16S rDNAs from different species of eubacteria, archaea, or fungi (depending on the primers used). Separated 16S rDNA segments may then be sequenced to identify the organisms from which the genes were isolated.

"Amendments" refers generally to any chemical compound (synthetic or naturally occurring) added to a polymeric composition from which porous beads are formed.

"Nutrients" and "Attractants" both refer generally to chemical compounds (synthetic or naturally occurring) or materials to which microorganisms are attracted. These are generally materials that are metabolized by microorganisms.

"Porous Beads" generally refers to highly porous beads of the present invention. These beads are generally less than 2–4 millimeters in diameter and generally have a porosity or void volume of about 70%. Although the present disclosure relates to porous beads, the invention may also be practiced with other porous media. The same basic methods used to make highly porous beads may also be used to make other geometric forms. Tubes, rods, disks, larger-scale beads, smaller-scale beads, and other geometric forms may also be made being highly porous with large amounts of available surface area. Although porous beads may have a larger surface area/g the surfaces of these other geometric forms would be substantially similar to the surfaces in the porous beads described above.

Whereas, the present invention has been described in relation to the drawings attached hereto, it should be understood that other and further modifications, apart from those shown or suggested herein, may be made within the spirit and scope of this invention.

ILLUSTRATIVE EXAMPLE OF THE PREFERRED EMBODIMENT

Figure 8:
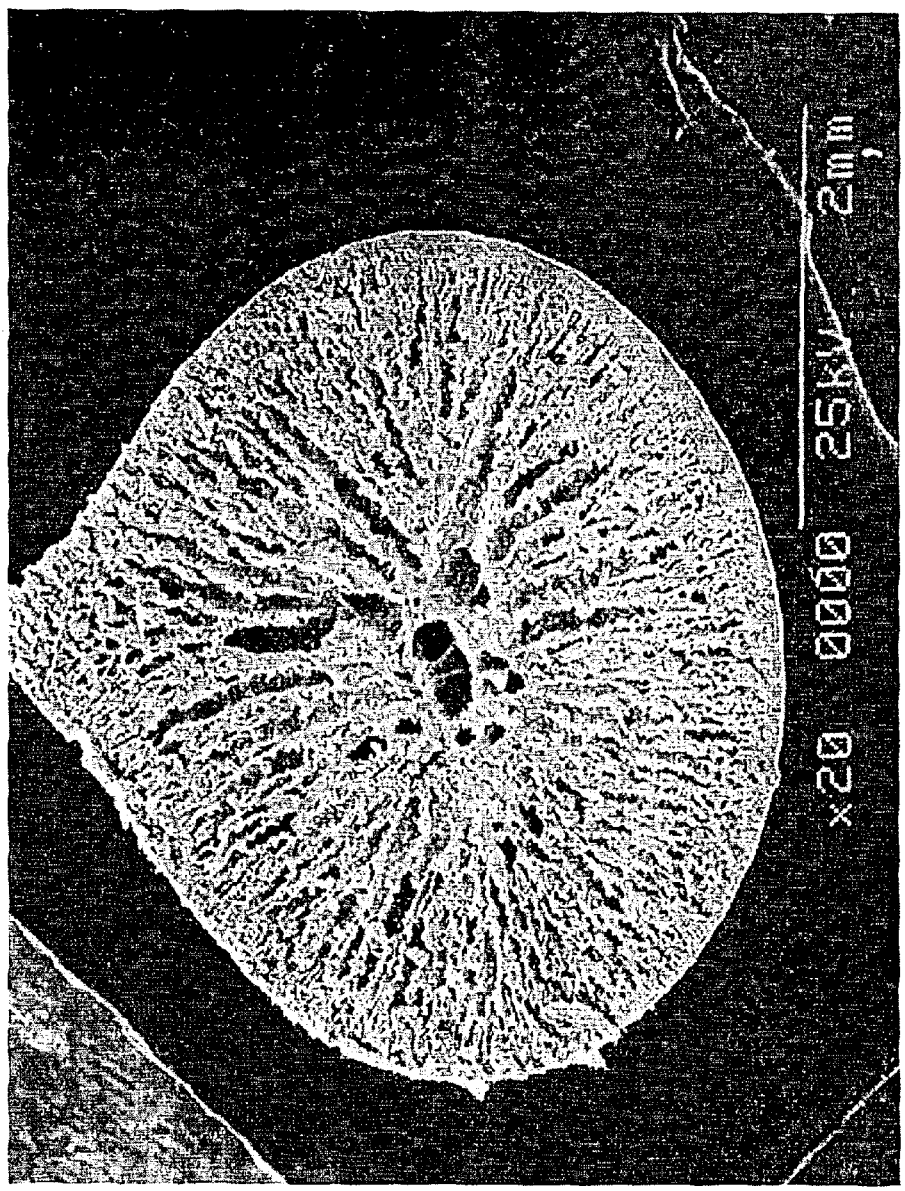
FIG. 8 is a scanning electron micrograph of a PAC/HRC bead

The following is an illustrative example of the preferred embodiment of the present invention in which porous beads have been amended with PAC and a polylactate commercial product known widely as HRC. FIG. 8 provides a SEM of a cross section of the PAC and HRC amended porous beads. These porous beads were used to evaluate the potential of HRC to alter the microbial ecology of an aquifer contaminated with perchloroethylene (PCE) to favor organisms that are capable of reductively dechlorinating PCE and other halogenated hydrocarbons. In this application HRC would act as what is called a remediation amendment. Typically remediation amendments for contaminated groundwater are tested for efficacy by pilot-scale injection of the amendment into the aquifer followed by detailed sampling and analysis of groundwater and soil cores to determine if the desired changes in subsurface microbial ecology have been achieved. The present invention can be used to evaluate these amendments without the cost of such an exercise by contacting the contaminated aquifer with porous beads of two types: beads impregnated with PAC and HRC and beads impregnated with just PAC. The beads impregnated with just PAC concentrate halogenated hydrocarbons and other carbon sources inside the beads through the attraction of these compounds for the activated carbon surface. This favors the environment inside the bead for collection and growth of microorganisms characteristic of active biofilms in that environment. In other words the PAC impregnated beads provide a "before" look at the microbial ecology of the unamended contaminated subsurface. HRC has been shown to stimulate the growth of microorganisms which dechlorinate PCE and other halogenated hydrocarbons. However, the response is not universal. The PAC/HRC impregnated beads will provide HRC as an additional carbon and energy source and thus, after suitable incubation in the contaminated aquifer, the microbial ecology of these beads will predict the effect of this amendment on the in situ microbial ecology of the aquifer when this material is injected into the aquifer.

The following testing was conducted at the site of a former dry cleaning business that had used PCE as the cleaning solvent. One groundwater monitoring well (MW1) was installed upgradient of the source and four groundwater monitoring wells (MW2A, MW2B, MW3, and MW4) were installed downgradient of the source. All wells had 10-ft screens across the water table. PCE was detected in all but MW1 at concentrations less than 10 mg/L. Products of reductive dehalogenation of PCE, namely trichloroethylene (TCE), cis-1,2-dichloroethylene (cisDCE), and elevated chloride ion were detected in downgradient wells indicating that reductive dechlorination was ongoing in the contaminated aquifer although incomplete.

A device similar to that illustrated in FIG. 8 was used to suspend both PAC and PAC/HRC impregnated beads in each monitoring well just below the water table. Beads were housed in PFA tubing with 3/32-in holes to allow water penetration. Tubing separately housing PAC beads and PAC/HRC beads were attached to the same nylon line and spaced 1 ft apart in each well. Each sampler contained about 60 beads and all samplers were incubated in contact with groundwater for 30 days.

Figure 9:
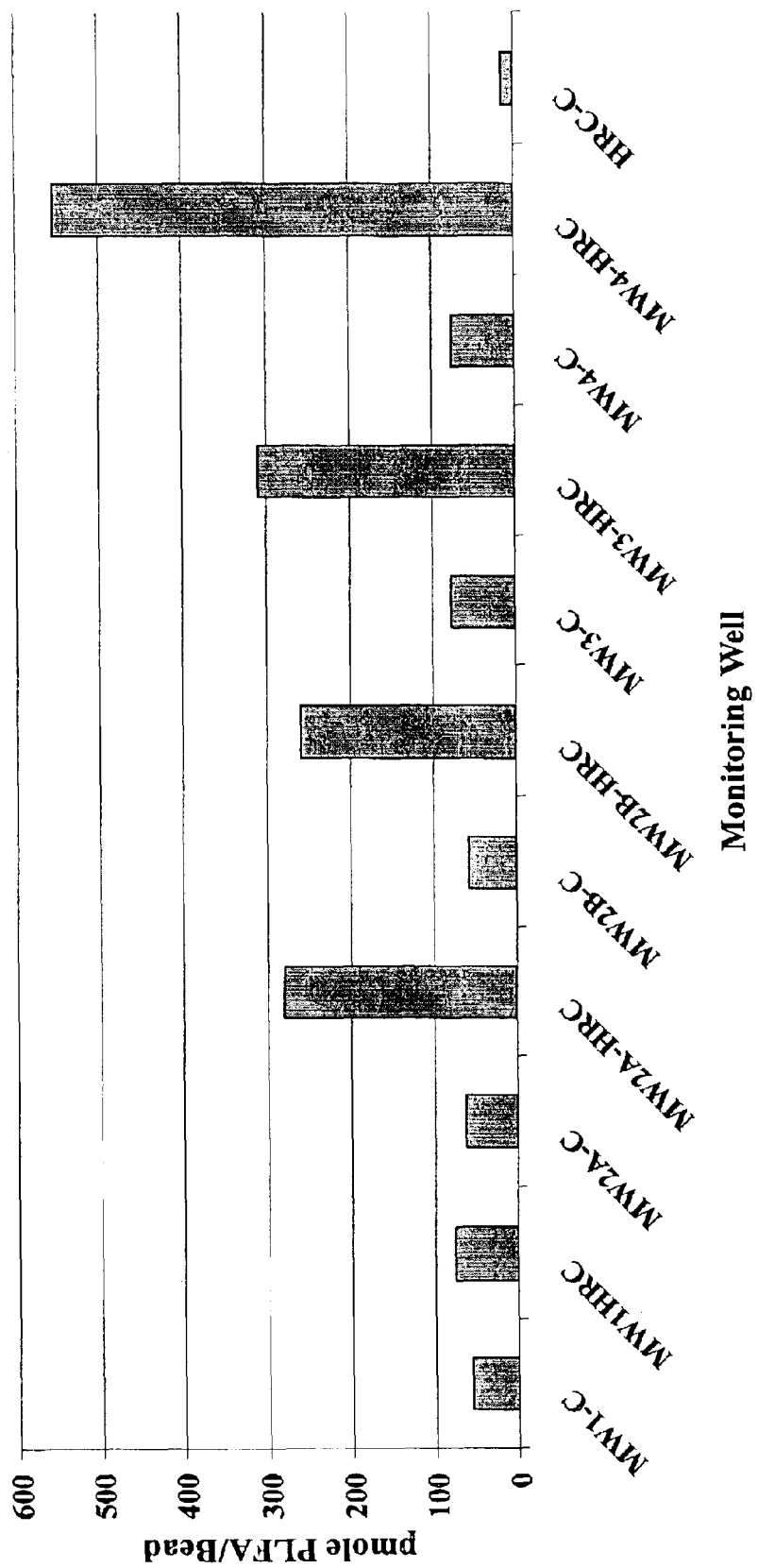
FIG. 9 shows the biomass PLFA collected by PAC and PAC/HRC beads in an aquifer contaminated with PCE
Figure 10:
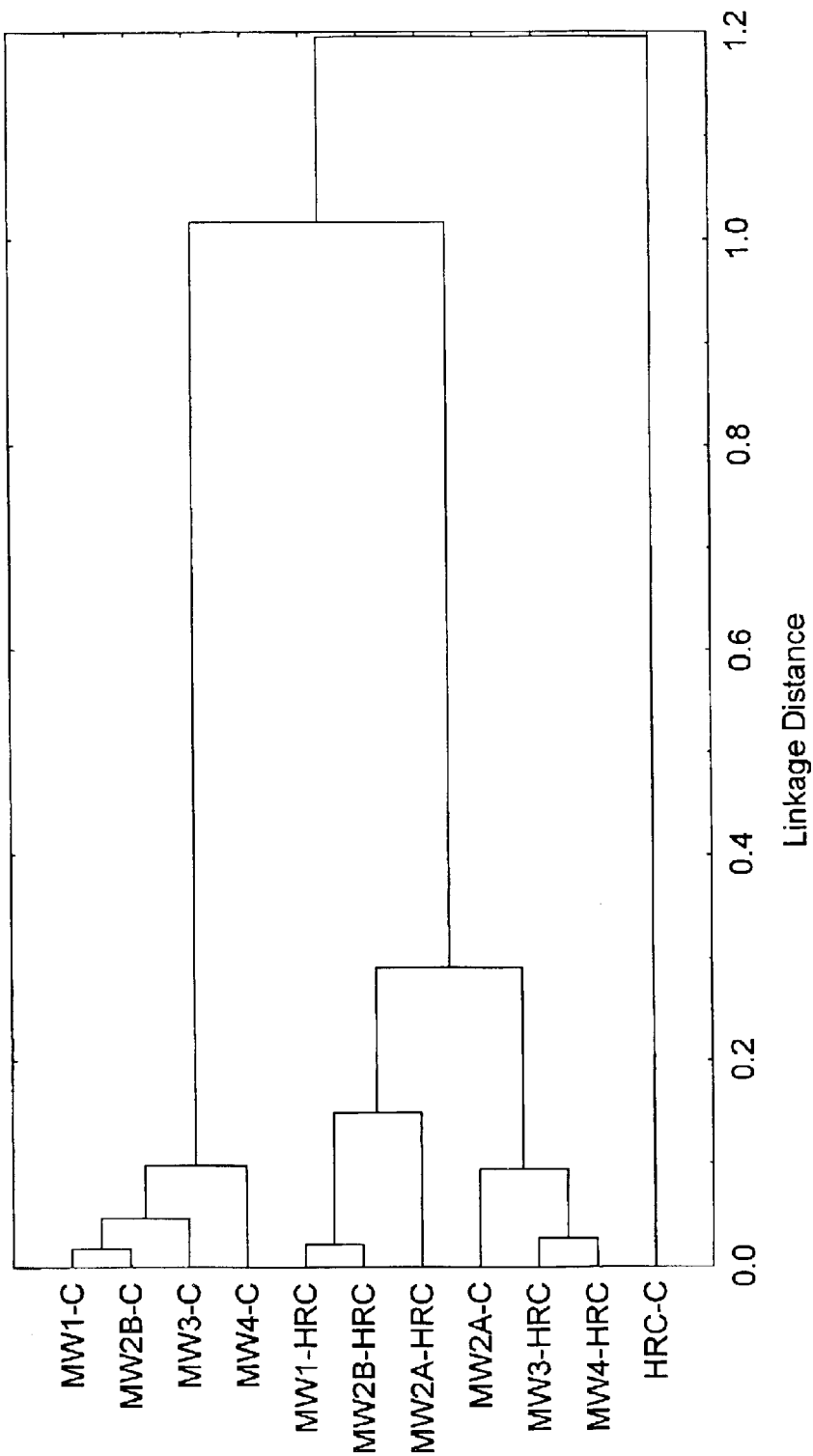
FIG. 10 shows a relationship tree comparing PLFA collected by PAC and PAC/HRC beads in an aquifer contaminated with PCE FIGS. 11a,b shows the respiratory quinones identified in PAC and PAC/HRC beads in an aquifer contaminated with PCE FIG. 12 compares the Shannon diversity index for PLFA and respiratory quinines from biomass collected by PAC and PAC/HRC beads in an aquifer contaminated with PCE

FIG. 9 show the total phospholipid fatty acid (PLFA) collected by each sampler in each well on a per bead basis. The amount of PLFA collected is proportional to the amount of viable biomass. It is seen from this figure that the presence of HRC greatly stimulated the collection of biomass in the contaminated part of the aquifer. The various types and relative amounts of fatty acids found in the collected PLFA are characteristic of the microbial community structure. FIG. 10 shows a relationship analysis of the fatty acids collected from PLFA in the two types of beads. This figure shows that the microbial communities collected in the two types of beads were very different from each other, and further all the communities collected by PAC beads were similar to each other and all the communities collected by the PAC/HRC beads were similar to each other in the contaminated wells. When the respiratory quinones from the two types of beads were compared from the contaminated wells it was seen that the distributions of different respiratory quinones were also different (FIGS. 11a,b) further illustrating that the microbial communities in the two types of beads were quite different. When the Shannon's diversity index was calculated for the PLFA and respiratory quinones for the two types of beads and plotted as a scatter plot (FIG. 12) it was seen that both of these analyses indicated a reduction in microbial diversity in the PAC/HRC beads compared to the PAC beads.

FIG. 13 provides a gel image of 16S rDNA genes obtained from beads of both types. The reduced microbial diversity indicated by the PLFA and respiratory quinone analyses was also reflected in the 16S rDNA data. Sequencing of the indicated bands revealed isolates and clones of bacteria previously identified in sites contaminated with halogenated hydrocarbons in four samplers, three of those containing PAC/HRC beads.

Taken all together the molecular analyses of the two types of beads predicts that amending the aquifer with HRC will stimulate microbial biomass production, decrease microbial diversity, and favor growth of organisms which metabolize halogenated hydrocarbons. Thus the same information sought by pilot-scale injection of HRC, coupled with microbial analysis of numerous groundwater samples and sediment cores was obtained using the current invention at a fraction of the cost.

What is claimed is:

1. A method for forming microcultures or biofilms within porous beads comprising:
   pretreating beads by preheating to a sufficient temperature such that biomarkers are destroyed, said beads having at least one amendment incorporated into them wherein said amendment is selected from the group consisting of a polylactate, zinc oxide, elemental sulphur, calcium carbonate, activated alumina, silica gel, adsorptive resin and clay;
   exposing said beads to an aqueous environment of a body of water having at least one microorganism; and
   allowing sufficient time for said at least one microorganism to enter into an interior of said beads.

2. The method for forming microcultures or biofilms within a porous bead of claim 1 further comprising allowing said at least one microorganism in said bead interior to propagate.

3. The method of forming microcultures or biofilms of claim 1 further comprising the exposure of said beads to nutrients prior to said exposure of said beads to an environment such that said nutrients become bound to said at least one amendment incorporated into the bead structure.

4. The method for forming microcultures or biofilms of claim 3 wherein said nutrients are selected from the group consisting of hydrocarbons, halogenated hydrocarbons, methyl-t-butylether, and t-butyl alcohol.

5. The method for forming microcultures or biofilms of claim 1 further comprising characterization, detection, and/or identification of microorganisms comprising of said microculture or biofilm within said beads.

6. The method of forming microcultures or biofilms of claim 5 wherein said detection comprises:
   solvent extraction of biopolymers; and
   molecular analysis of said biopolymers.

7. The method of forming microcultures or biofilms according to claim 1 wherein said at least one microorganism comprises a plurality of microorganisms.

8. The method of forming microcultures or biofilms according to claim 1 wherein said at least one amendment amounts to between about 0.75 and about 7 times the weight of said polymer.

9. The method of forming microcultures or biofilms according to claim 1 wherein each of said beads has a void volume of at least about 40% of the total bead volume.

10. A method for forming microcultures or biofilms within porous beads comprising:
    pretreating beads by preheating to a sufficient temperature such that biomarkers are destroyed, said beads having at least one amendment incorporated into them;
    exposing said beads to nutrients such that said nutrients become bound to said at least one amendment and wherein said nutrients are selected from the group consisting of hydrocarbons, halogenated hydrocarbons, methyl-t-butylether, and t-butyl alcohol;

exposing said beads to an aqueous environment having at least one microorganism; and allowing sufficient time for said at least one microorganism to enter into an interior of said beads.

11. A method for forming microcultures or biofilms within porous beads comprising:

pretreating beads by preheating to a sufficient temperature such that biomarkers are destroyed, said beads having at least one amendment incorporated into them;

exposing said beads to an aqueous environment having at least one microorganism;

allowing sufficient time for said at least one microorganism to enter into an interior of said beads; and characterizing, detecting, and/or identifying microorganisms comprising said microculture or biofilm within said beads.

12. A method for forming microcultures or biofilms within porous beads comprising:

pretreating beads by preheating to a sufficient temperature such that biomarkers are destroyed, said beads having at least one amendment incorporated into them;

exposing said beads to an aqueous environment having at least one microorganism;

allowing sufficient time for said at least one microorganism to enter into an interior of said beads; and wherein said porous beads are composed of an aramid polymer selected from poly(m-phenylene isophthalamide) and copolymers thereof, and a polymer or copolymer formed from m-phenylene diamine and an acid selected from the group consisting of terephthalic acid, isophthalic acid and 2,4-diaminobenzene sulfonic acid.

13. A method for forming microcultures or biofilms as set forth in claim 1 wherein said amendment attracts and binds to said nutrients from said aqueous environment, said amendment is a nutrient, or said amendment interacts with said aqueous environment to make said beads more conducive to growth of microorganisms.

14. A method for forming microcultures or biofilms as set forth in claim 1 wherein said beads may take various geometric forms including tubes, rods and disks.

* * * * *